(No Model.)

W. KOCH.
CASH INDICATOR AND RECORDER.

No. 398,625. Patented Feb. 26, 1889.

Attest:
A. N. Jesbera
E. M. Watson

Inventor:
William Koch
By David A. Burr
Atty.

(No Model.) 4 Sheets—Sheet 2.

W. KOCH.
CASH INDICATOR AND RECORDER.

No. 398,625. Patented Feb. 26, 1889.

Attest:
A. N. Jesbera
E. M. Watson

Inventor:
William Koch
By David A. Burr
Att'y.

(No Model.)
4 Sheets—Sheet 3.
W. KOCH.
CASH INDICATOR AND RECORDER.
No. 398,625. Patented Feb. 26, 1889.
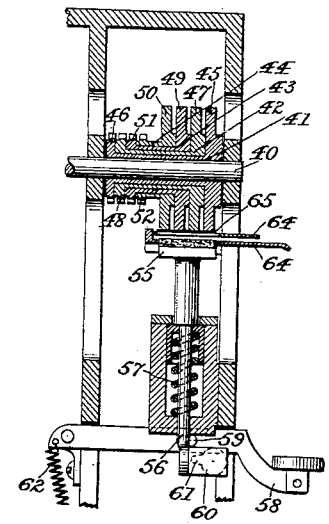
Fig. 10.
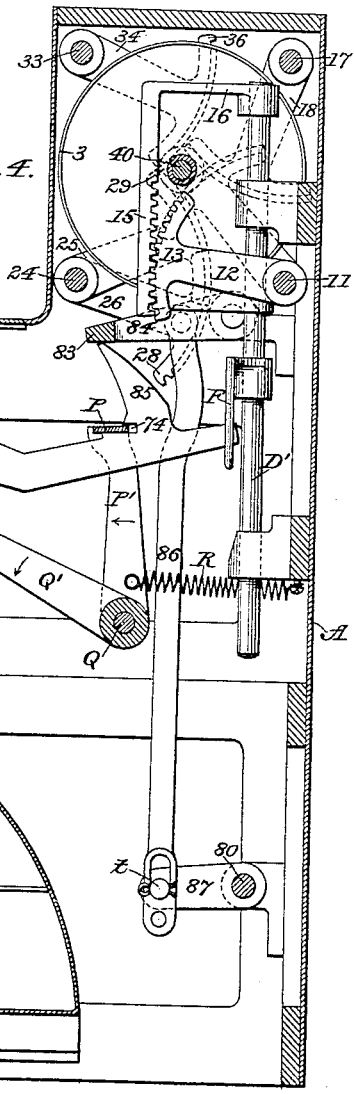
Fig. 4.
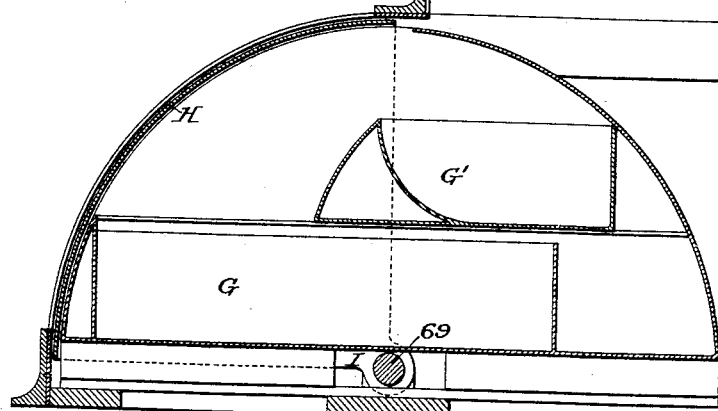
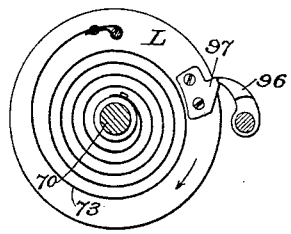
Fig. 11.
Attest:
A. N. Jesbera
E. Mc Watson
Inventor:
William Koch
By David A. Burr.
Atty.

(No Model.) 4 Sheets—Sheet 4.
W. KOCH.
CASH INDICATOR AND RECORDER.
No. 398,625. Patented Feb. 26, 1889.
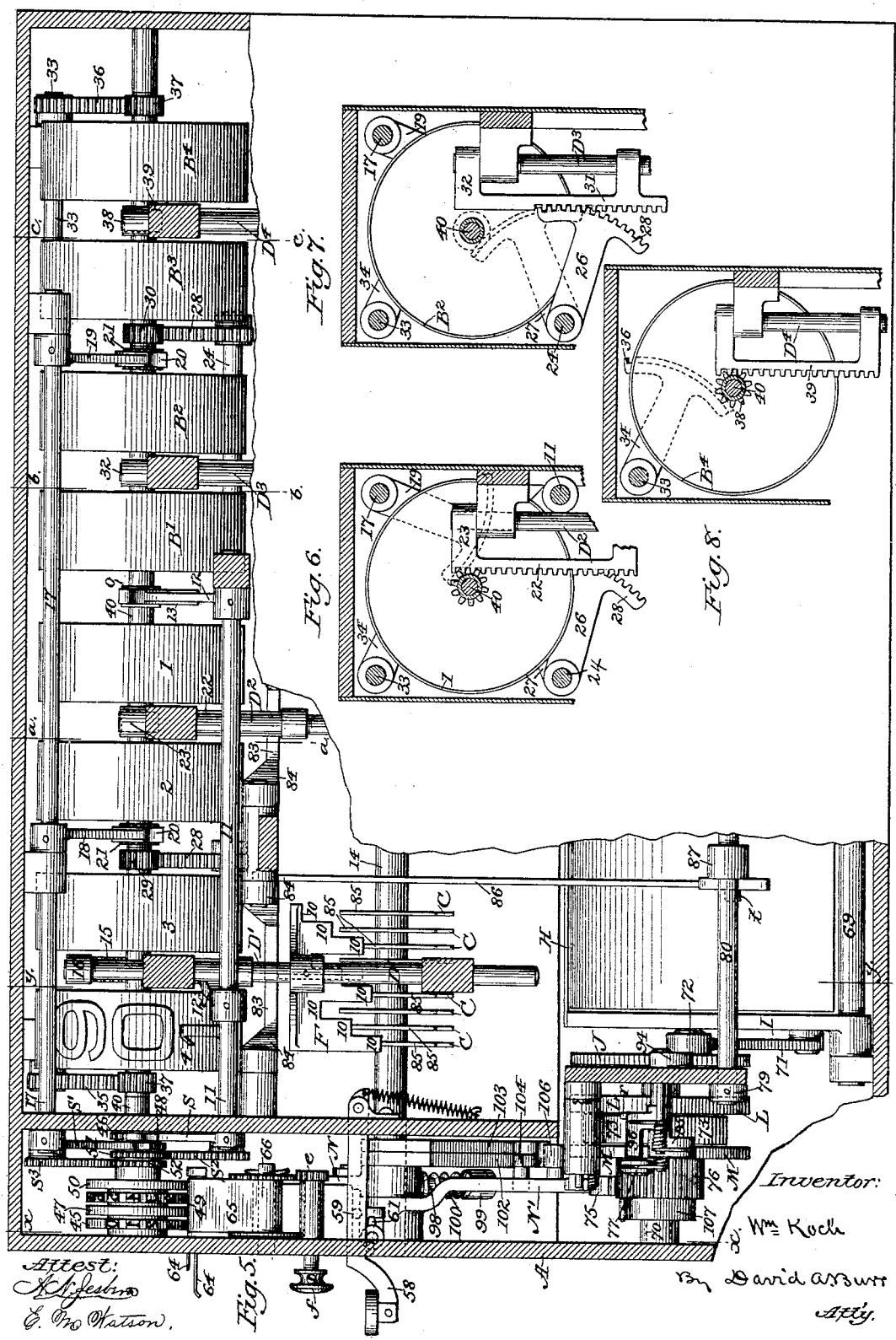

UNITED STATES PATENT OFFICE.

WILLIAM KOCH, OF NEW YORK, N. Y.

CASH INDICATOR AND RECORDER.

SPECIFICATION forming part of Letters Patent No. 398,625, dated February 26, 1889.

Application filed March 23, 1888. Serial No. 268,195. (No model.)

*To all whom it may concern:*

Be it known that I, WILLIAM KOCH, of the city, county, and State of New York, have invented certain new and useful Improvements in Cash-Indicating and Check-Printing Machines; and I do hereby declare that the following is a full and exact description thereof, reference being had to the accompanying drawings, and to the letters of reference marked thereon, making a part of this specification, in which—

Figure 1:
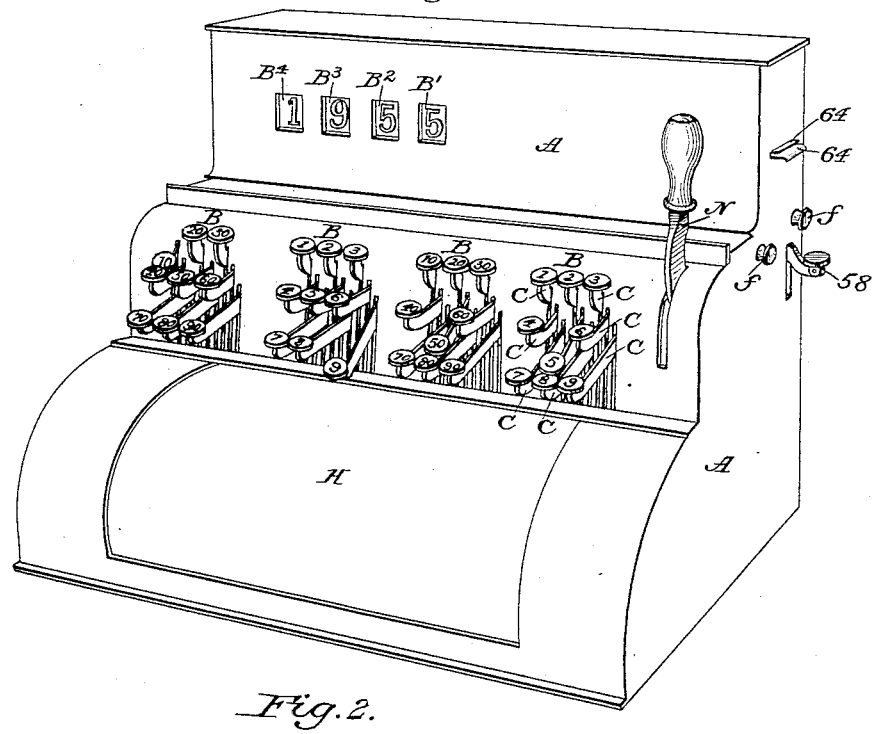
Figure 2:
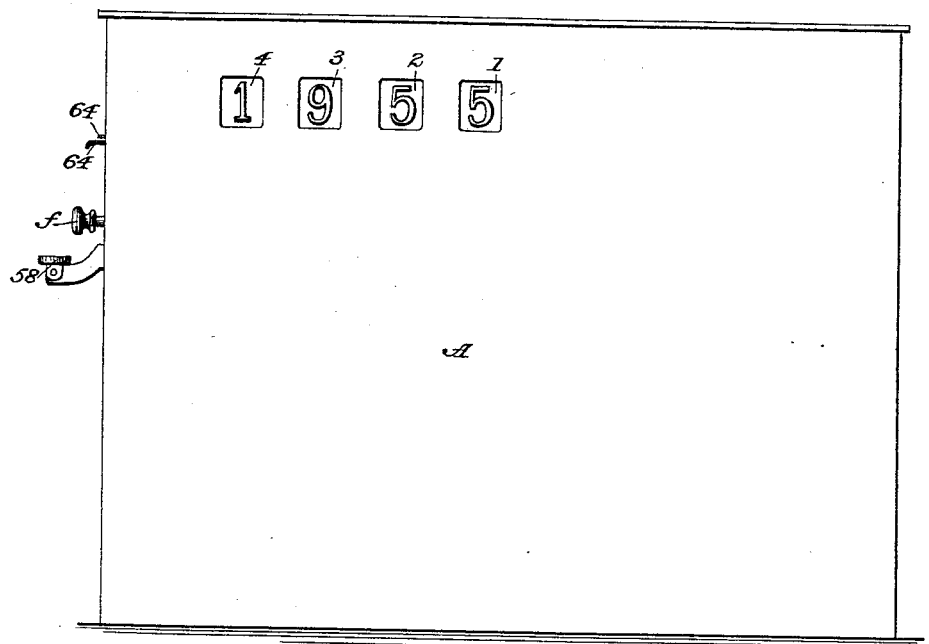
Figure 9:
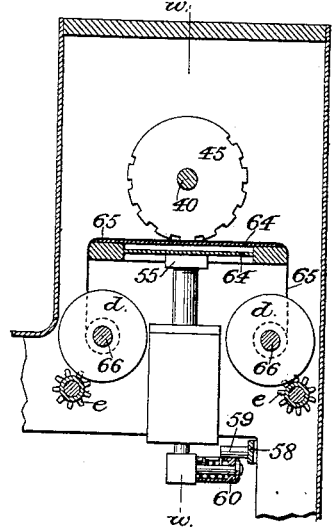
Figure 3:
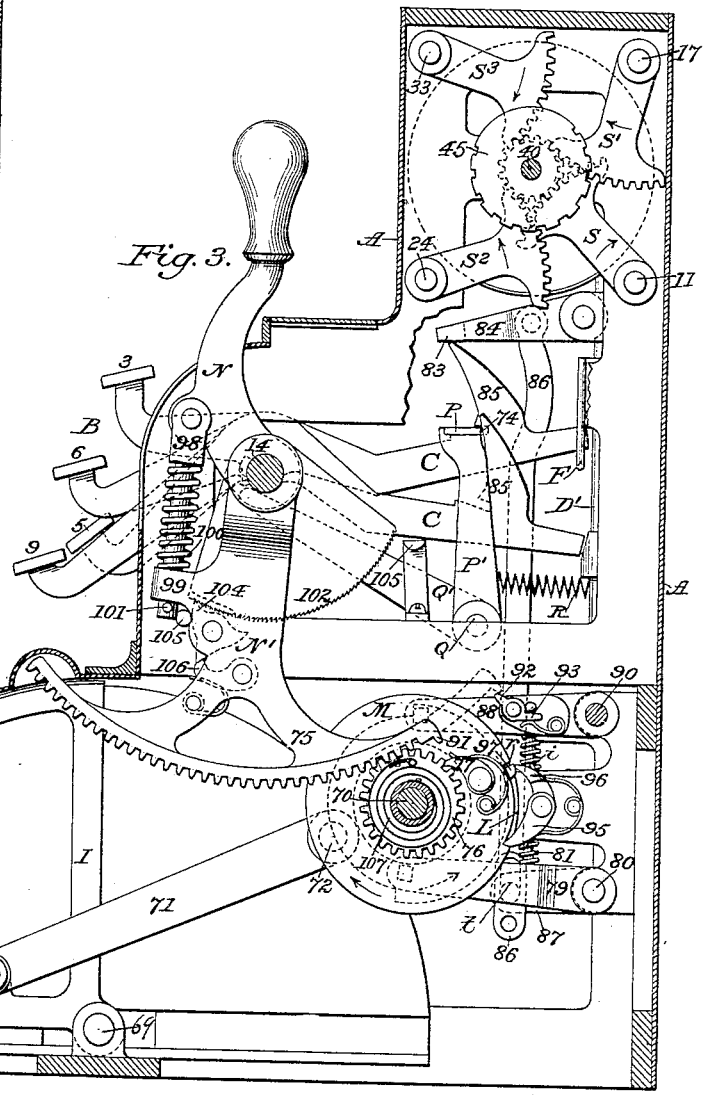

Figure 1 is a view in perspective of the front of a cash-indicating machine embodying my improvements; Fig. 2, a rear elevation thereof. Fig. 3 is a vertical section in the line $xx$ of Fig. 5 with the printing mechanism omitted; Fig. 4, a vertical section in line $yy$ of same figure. Fig. 5 is a rear elevation, on an enlarged scale, of the machine with a portion of the casing broken away. Figs. 6, 7, and 8 are detached transverse vertical sections on the lines $a\ a\ b\ b\ c\ c$, respectively, of Fig. 5, each looking to the right. Fig. 9 is a detail vertical section in line $x\ x$ of Fig. 5 of the printing mechanism alone; Fig. 10, a transverse section in line $w\ w$ of Fig. 9. Fig. 11 is a detail view, in elevation, of one face of the controlling-disk in the lid-actuating mechanism; and Fig. 12, a similar view of its opposite face and of the pivoted spring-actuated arms which govern it.

Similar letters and numerals indicate like parts in all of the figures.

My invention relates to that class of cash indicating and registering machines in which a cash receptacle or drawer is combined with the indicating apparatus.

In the improved machine the cash-receptacle is closed by a spring-actuated lid and the keys are arranged in a series of groups.

The invention consists in a combination and arrangement of mechanism, substantially as is hereinafter described and claimed, whereby, in the first place, the play of any one of the keys will operate to turn one or more indicating-wheels, a pair of corresponding wheels being by preference located, respectively, at each end of the machine and geared together so as to properly indicate the number designated by the operating-key simultaneously at the front and at the rear of the machine, and then automatically lock the same and simultaneously release the spring-actuated lid, so that it will automatically cover and close the cash-receptacle in the base of the machine and become locked in its closed position; and, in the second place, the movement of a suitable handle will operate automatically to release each actuated key and its indicating-wheel and allow them to return automatically to their first or normal positions and simultaneously wind up the spring which actuates the lid, unlock said lid, and then release it, so that it shall automatically fly open.

It consists, furthermore, in the combination, substantially as hereinafter set forth and claimed, of printing-wheels with the indicating-wheels, so that the one shall move simultaneously with the other and bring in proper order to a line of print numbers corresponding with those exhibited by said wheels, and also of mechanism for obtaining an impression of said numbers upon a check or strip of paper from the printing-wheels.

In the accompanying drawings, A represents the outer casing of the entire machine; B B, groups of keys, each group consisting, preferably, of nine keys arranged, for convenience and compactness, as is customary, in three rows of three each.

The machine shown is constructed with four groups of keys, the first group being made to indicate from 1 to 9 cents, the second from 10 to 99 cents, the third from 1 to 9 dollars, and the fourth from 10 to 99 dollars, so that with this machine the amount, from a cent to $99.99, received in any one payment may be brought to view upon the indicators and registered and be also printed upon a suitable check.

The keys C C C are all pivoted, as is usual, upon a common horizontal shaft, 14, and each key constitutes a lever of the first order with the shaft as its fulcrum. This shaft is mounted to rock in its bearings and is fitted with a hand-lever, N, by means of which it may be actuated.

Whenever any one key in a group is operated or played—*i. e.*, is elevated at its inner end by the depression of its outer end, (see key 5, Fig. 4)—it is automatically upheld and locked in its elevated position by means of a transverse plate or strip, P, mounted upon arms P' P', projecting between the key-shaft 14 and the inner ends of the keys from a rock-shaft, Q, which is parallel with the key-shaft 14 and below the same. The locking-strip P swings upon said rock-shaft as its axis, so that it may engage a notch, 74, cut in the proximate edge of a key plate or finger, 85, made to project upward from each key-lever near its inner end whenever by the elevation of said end the notch is brought into register with said strip, as shown in Fig. 4. The automatic engagement of the strip with the key-plate 85 is enforced by means of a spring, R. The strip P is withdrawn from its engagement with the notch 74 in the key-plate 85 by the movement of an arm, Q′, projecting radially from the rock-shaft Q under the key-shaft 14 in position to be engaged and depressed by a toe, W, upon said shaft whenever the shaft is rocked by a movement of its hand-lever N. (See Fig. 3.)

The several keys in each group B of keys are made to actuate by their play or oscillation a separate vertical rod, D′, D², &c., mounted to reciprocate in suitable bearings at the rear of the machine, the rear end of each key being made, when the key is played by a depression of its front end, to bear against a cross-plate, F, secured to the rod, (see D′, Fig. 5,) so as to operate thereby to lift the rod. The lower edge of this plate F is, however, cut away irregularly, so as to afford a different bearing-point, 10, for each key. These bearing-points are formed differentially (see Fig. 5) and so adjusted that the key indicating the number 1 may not strike its bearing 10 until the movement or play of the key is nearly completed, and the length of movement which it imparts to the rod D′ after contact with said bearing is taken as a unit of which the different lengths of stroke imparted to the same rod by the remaining eight keys are severally multiples. The contact of the 5-key, for instance, with its bearing 10 on the plate F, is attained at a point where in subsequently completing its stroke the key will necessarily move the rod D′ five times the distance which key 1 will move it.

A series of wide-faced wheels, 4 3 2 1 and B′, B², B³, and B⁴, are mounted in the upper portion of the machine to revolve independently on a common horizontal axis, 40, and the digits 1 to 9 are marked upon the periphery of each, (to correspond with the digits of the several groups of keys,) with the addition thereto of a cipher. These eight indicating-wheels are divided into two sets of four each, and the figures on the four to the left of the front of the machine are made to appear singly through a longitudinal front opening in the casing, as shown in Fig. 1, while those on the remaining four appear in like manner at an opening to the left on the rear face of the machine, as shown in Fig. 2.

The eight wheels are so geared as to move in pairs. Thus the two wheels 1 and B′, which are in view at the extreme right of both the front and rear sight-openings and which indicate units, are made to revolve in unison. The next two wheels in order to the left, 2 and B², which indicate tens, are in like manner made to revolve together, as are also the two hundreds-wheels, 3 and B³, and the two thousands-wheels, 4 and B⁴. The two units-wheels 1 and B′, being next to each other, are both fitted upon a common axial shaft and are made to revolve by the reciprocation of the vertical rod D′, actuated by the first or units group of keys through the intervention of a horizontal rock-shaft, 11, mounted in the frame of the machine outside of the wheels. This rock-shaft 11 is fitted with two radial arms, 12 12, extending inwardly, the one between the wheels 1 and B′ and the other below the wheels and alongside of the upper end of the rod D′. These arms terminate, respectively, in similar segmental racks, 13 13, the one being made to gear with a pinion, o, upon the axial shaft of said wheels 1 and B′ and the other with a vertical rack, 15, carried by the rod D′, to which it is attached by means of a cross-arm, 16. (See Fig. 4.)

The two tens-wheels 2 and B² revolve upon independent axles, but are geared together by means of a rock-shaft, 17, (see Fig. 5,) mounted parallel with the shaft 11 at the top and rear of the frame of the machine. This rock-shaft 17 is fitted with two radial arms, 18 19, which terminate in segmental racks 20 20, to gear, respectively, with pinions 21 21, secured, severally, upon the axles of the two wheels 2 and B², while a vertical rack, 22, carried by the indicator-rod D² of the second groups of keys and attached to said rod by a cross-arm, 23, is made to gear directly with a pinion fixed upon the axle of the wheel 2. The hundreds-wheels 3 and B³ also revolve each upon an independent axle and are geared together by means of a rock-shaft, 24, mounted in the front part of the frame of the machine below the wheels and parallel with the shafts 11 and 17, said shaft being fitted with three radial arms, 25, 26, and 27, each terminating in a segmental rack, 28. Two of said racks, 25 27, are made to gear, respectively, with pinions 29 and 30, severally fixed upon the axles of the wheels 3 and B³, and the third, 26, with a vertical rack, 31, carried by the indicator-rod D³, which is actuated by the third group of keys, the rack being attached to the rod by a cross-arm, 32. The thousands-wheels 4 and B⁴ likewise revolve upon independent axles, and are similarly geared to revolve in unison by means of a fourth rock-shaft, 33, mounted in the upper front portion of the frame near the top of the wheels parallel with the shaft 24, said rock-shaft being fitted with two radial arms, 34 34, to project outside of the wheels 4 and B⁴. These arms terminate in segmental racks 35 and 36, engaging, respectively, pinions 37 37, fixed severally upon the axles of said wheels, the opposite end of the axle of the wheel B⁴ being fitted with a second pinion, 38, to gear with a vertical rack, 39, carried by the indicator-rod D⁴, which is actuated by the fourth group of keys.

The pinions are so proportioned with reference to the length of stroke of the indicator-rods that a full movement of either rod, as produced by operating or playing the nine-key in either group, will produce a revolution of the corresponding indicator-wheels from 0 to 9.

The wheels when properly geared and adjusted will, when the indicator-rods are depressed, exhibit the cipher, and when the keys are free the rods are automatically depressed and the several indicating-wheels thereby brought to their normal position to exhibit each the cipher thereon by the weight of the rods and of the racks which they carry. This automatic drop of the indicator-rods by means of their gravity serves not only to carry the indicating-wheels to their normal position at zero, but also to elevate the outer end of the key which has been played, so as to restore it to its normal position. The figures upon the two sets of indicating-wheels are relatively so adjusted that corresponding figures on each shall appear simultaneously at the front and rear openings, through which they are respectively brought to view, and hence the reading of the figures at each opening will always be the same.

The ends of each of the four parallel rock-shafts 11, 17, 24, and 33, which are respectively actuated, in manner as described, by the movements of the several indicator-rods D', D², D³, and D⁴, are extended out at one end of the machine, and a central axle, 40, is fixed midway between them parallel therewith. Upon this axle are fitted four concentric tubular shafts, 41, 42, 43, and 44, differing in length. The innermost of these shafts, 41, is the longest. It revolves freely upon the axle 40 and carries upon its outer end a type-wheel, 45, and upon its inner end a toothed wheel or pinion, 46. The next shaft, 42, revolves freely upon the shaft 41, and also carries upon its outer end a type-wheel, 47, and upon its opposite end a toothed wheel, 48. In like manner the concentric shafts 43 and 44 revolve, respectively, each loosely upon the shaft encircled thereby, and each is fitted with a type-wheel, 49 and 50, at its outer end, and a toothed wheel, 51 and 52, at its inner end. The four type-wheels are thus brought side by side at one end and the four toothed wheels side by side at the other. All four type-wheels are of the same diameter, and the toothed wheels are likewise equal in diameter.

Each type-wheel carries upon its periphery type representing the nine digits and a cipher, or other figures to correspond with the figures on the indicating-wheels. The toothed wheels 46, 48, 51, and 52 are severally geared each with a segment, S, S', S², or S³, carried upon an arm projecting from one of the four rock-shafts 11, 17, 24, and 33. The innermost type-wheel shaft, 41, is thus geared by its pinion 46 to the rock-shaft 11, which is actuated, in manner as described, by the indicator-rod D' of the first or units group of keys. The second type-wheel shaft, 42, is in a similar manner geared by its pinion 48 to the rock-shaft 17, actuated by the indicator-rod D². The third type-wheel shaft, 43, is in a similar manner geared to the indicator-rod D³, and the fourth, 44, to the indicator-rod D⁴. These type-wheels are so adjusted that when the indicator-rods are all in their normal or depressed position and the indicating-wheels all stand at zero the cipher-type upon the several wheels shall all be in line of print, and a movement of any one rod shall bring to line of print a type upon the type-wheel which it actuates corresponding to the number of the key played and of the figure exhibited on the indicating-wheels.

To obtain an impression from the type-wheels of such figures thereon as are brought to the line of print, a spring-actuated platen, 55, (see Fig. 9,) is mounted under the wheels upon a vertical rod, 56, adapted to play freely in suitable bearings in the frame, and which is automatically carried upward when free by an encircling spiral spring, 57. The platen is carried by the spring to within a short distance of the type, and is then left free to move up independently of the spring, so as to strike the type by momentum alone. It is actuated by means of a lever, 58, pivoted at one end to the frame, to extend beyond the platen-rod 56 and out through the casing at the end of the machine, said lever operating to depress the platen and compress its spring 57. A lateral pin, 59, upon said lever is made to engage, as the lever is carried downward, a lug, 61, (see dotted lines, Fig. 10,) upon a spring-actuated sleeve, 60, rotating upon a stud projecting from the platen-rod. (See Fig. 9.) The movement of the sleeve in a direction to allow the lug 61 to turn out of engagement with the pin on the lever is prevented by a suitable stop, its contact with the stop being enforced by a spiral spring inclosed within the sleeve, so that the lug will furnish a bearing for said pin as the pin moves downward. Hence as the lever 58 descends its pin 59 strikes the lug 61 and carries down the platen-rod 56 and platen 55 until, by reason of the sweep of the pin about the pivot of the lever it slips off of the lug, whereupon the platen will fly up, under the influence of its spring 57, to strike the type. As the lever moves up again, the play of the sleeve 60, carrying the lug 61, will allow the pin 59 on the lever to turn the lug so as to slip by it, while the action of the spring upon the sleeve will carry the lug back again into its normal position. The lever 58, after being depressed to draw down the platen, is automatically returned to its normal position by means of a spring, 62. (See Fig. 10.)

Parallel horizontal guide-plates 64 64 are fitted in the end of the frame-work of the machine (see Fig. 10) in position to guide a strip of card-board or paper in between the platen and type-wheels in readiness to receive an imprint from said wheels, the plates being slotted to permit the platen to pass through them against the type. An inking-ribbon, 65, is led horizontally over the upper guide-plate, so as to cover the slot therein and be interposed between the type and the paper inserted between the plates 64 64, said ribbon being wound upon spools $d\ d$, (see Fig. 9,) carried upon spindles 66 66, mounted in the frame on each side of the plates, and which are geared to pinions $e\ e$, actuated by rotating knobs $f\ f$ outside of the casing, as shown in Figs. 1, 5, and 9, to facilitate their movement by hand in feeding the ribbon back and forth under the type.

The platen 55, in moving up through the slots in the guide-plates, will carry the paper inserted between said plates against the inked face of the ribbon and force the paper and ribbon against the type, so as to cause the latter to produce their imprint upon the paper in the customary manner.

A cash receptacle or box, G, of any suitable description, is arranged in the base of the machine. The receptacle illustrated in the drawings, Fig. 4, is represented as constructed in two sections, the lower one, G, being stationary and the upper one, G', adapted to slide in and out upon the lower one. The opening into this cash-box is covered by a movable curved lid, H, which, being in the form of a segment of a cylinder, is mounted at each end upon quadrants I I, each of which is secured at the intersection of its straight sides to an axial rock-shaft, 69, mounted in suitable bearings in the base of the machine, so that the lid attached to said quadrants and vibrating with the rock-shaft may be thereby turned down to cover and close the opening into the cash-box, or swung up to uncover the same. The reciprocating movement of the lid is produced by the revolution of a ratchet-wheel, J, fixed to turn loosely upon a shaft, 70, mounted parallel with the axis of the lid in the base of the machine, and which is coupled to one of the quadrants by means of a connecting-rod, 71, pivoted at one end to the front arm of the quadrant and at the other to a wrist-pin, 72, projecting from the outer face of the wheel, the two being so arranged that a continuous revolution of the wheel in one direction will operate to swing the quadrants back and forth, and thereby alternately open and close the lid H, carried thereon.

The wheel J is made to revolve by the tension of a helical spring, 73, coiled around the shaft 70 between two parallel disks, L and M, one of which, L, is fixed to the shaft and the other, M, mounted to turn loosely upon it, the ends of the spring being made fast, respectively, to the two disks.

The spring 73 is wound to actuate the wheel J by the movement of the hand-lever N, actuating the rock-shaft 14, upon which the keys are pivoted, through the intervention of a segmental rack, 75, adapted to gear with a toothed wheel, 76, revolving loosely upon the shaft 70, alongside the disk M, but which is coupled thereto when turning in the direction to wind up the spring by means of a pawl, 77, pivoted to the side of the disk to engage the teeth of the wheel 76.

Figure 12:
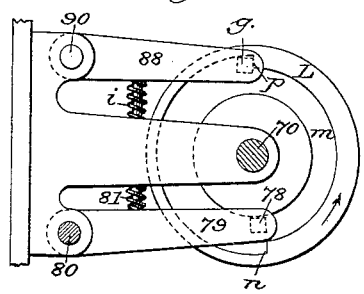

Normally the hand-lever N rests in a vertical position, its handle end being made to project out through the casing of the machine, as shown in Figs. 1 and 3. By swinging the handle forward and down the segmental rack is made to turn the toothed wheel 76 in a direction to wind the spring 73, and by reason of the engagement of the pawl 77 with said toothed wheel the disk M and its attached spring 73 is turned with it, so as to cause the spring to be wound up. In the meantime the wheel J is held to confine the outer end of the spring by means of a pin, 78, upon the end of an arm, 79, projecting from a rock-shaft, 80, to engage a notch, $n$, in the periphery of an annular concentric groove, $m$, cut in the face of the disk L, as shown in Fig. 12. After the spring is wound it is prevented from unwinding as the handle N makes its reverse movement by means of a pawl, 95, adapted to engage a notch in the periphery of the disk M. The disk M being thus held by the pawl 95, the reverse movement of the hand-lever to restore it to its normal upright position is permitted by the independent revolution of the toothed wheel 76 in the opposite direction produced, as the lever is thrown up.

The respective gears are so proportioned that a single downward stroke of the hand-lever N will operate to wind the spring 73 sufficiently to give it the requisite power to produce effectively one complete revolution of the wheel J. This revolution is permitted, when the spring is wound, by lifting the pin 78 out of the notch $n$; but the pin, riding in the groove $m$, will again automatically engage the notch so soon as the single revolution is completed, its engagement being enforced by means of a spring, 81, actuating the arm 79, carrying the pin.

The disengagement of the pin 78 from the notch $n$ is produced automatically in the machine by the play of any one key in the entire series of keys through the intervention of a series of swinging bars, 83 83, (one for each group of keys,) each pivoted upon arms 84 84, so as to rest transversely over the rear ends of all the keys in a group in position to be engaged by fingers 85 85, projecting upwardly from each key-lever, and to be lifted by either one of said fingers when its key is played. One of the arms 84 of each of said swinging bars 83 is coupled by a connecting-rod, 86, with a radial arm, 87, projecting from the rock-shaft 80, so that the lifting of either bar 83 by the play of a key (see Figs. 3 and 4 and dotted lines in Fig. 5) will operate to oscillate the shaft 80, and thereby lift the arm 79, and with it the pin 78. The connection of the rod 86 with the arm 87 is effected by means of a pin, $l$, projecting from the arm through a longitudinal slot in the rod, whereby a certain extent of lost motion is permitted before the arm is lifted by the key, as shown in dotted lines, Fig. 3.

The swinging lid H of the cash-box is so adjusted with reference to its actuating-wheel J and controlling-disk L that when the key-pin 78 is in engagement with the notch $n$ on the disk L the lid will be wide open.

As a complete revolution of the controlling-disk L and wheel J will operate not only to close the lid, but to open it again, provision is made for arresting the wheel J so soon as it has made a half-revolution, and thereby closed the lid, by cutting a second notch, $p$, in the periphery of the annular groove $m$ on the face of the disk L at a point diametrically opposite the first notch, $n$, (see Fig. 12,) and providing a second pin, $g$, upon the end of an arm, 88, to engage said notch, its engagement being enforced by a spring, $i$. This arm 88 is made to project from one end of a rock-shaft, 90, which is parallel with the shaft 70, and whose opposite end extends into line with the segmental rack 75.

The proximate end of the rack 75 is fitted with a tooth, 91, which, as the rack moves toward the arm, strikes against a pivoted lug, 92, on the end of the arm 88, and, moving it, passes by it; but as it returns and again engages the lug the lug is prevented from yielding by a stop-pin engaging an offset, 93, thereon, and the rack is consequently made to depress the arm, so as to clear the lug, and by depressing the arm causes a release of the pin $g$ from the notch $p$ and allows the controlling-disk L to complete its revolution, and thereby close the lid H. A reverse movement of the lid at any point is prevented by a pawl, 94, which engages a series of ratchet-teeth on the periphery of the actuating-wheel J. (See Fig. 5.)

At the moment the downward movement of the handle N is completed and the spring 73 is consequently fully wound the pawl 95, engaging the winding-disk M, prevents its reverse movement and a consequent uncoiling of the spring independently of the disk L. A second spring-actuated pawl, 96, pivoted upon the pivotal stud of said pawl 95, is in the meantime held out of engagement with a notch or shoulder, $r$, on the periphery of the disk M by means of an offset or projection, 97, upon the controlling-disk L, said projection 97 being adapted to pass under a lateral offset or extension of the pawl 96, formed to overlap the periphery of said disk; but so soon as, upon the completion of the return or up stroke of the handle N, the disk L is allowed, as hereinbefore described, to make a half-revolution, the pawl 96 will drop into engagement with the shoulder $r$ upon the disk M, and thereby operate to prevent a forward movement of said disk. By this means a complete lock of the disk M and handle N and of all mechanism actuated thereby is produced until a key is depressed and the disk L permitted to complete its revolution and close the lid H, whereupon the completion of the revolution of the disk L, by bringing the offset 97 again under the pawl 96, will release it.

The action of the hand-lever N upon the rock-shaft 14 to produce its oscillation is preferably cushioned, as shown in Fig. 3, by pivoting the lever loosely upon the shaft, and then coupling the two together by means of a rod, 98, pivoted to an offset on the lever, to work through an aperture in a corresponding offset, 99, projecting from the arm N' of the segmental rack 75, fixed to said shaft, the rod being encircled by a spring, 100, interposed between said offsets, and prevented from drawing out of the offset 99 by means of a transverse pin, 101.

To prevent a reversal of the hand-lever N in either direction at any point intermediate the extreme limits of its movement, two segmental ratchets, 102 and 103, (see Figs. 3 and 5,) are fixed to the frame of the machine close alongside and parallel with the arm N' of the segmental rack 75, and a double-ended pawl, 104, is pivoted to said arm in position to move over said ratchets and to engage the teeth of the one when moving in the one direction and of the other when moving in the opposite direction. This double pawl 104 is tripped at the end of the stroke of the lever, so as to change its engagement from the one ratchet to the other, by striking against suitable stops, 105 105, fixed to the frame, and so soon as tripped it is supported and kept in engagement with the ratchet by means of a spring-actuated latch, 106, pivoted to the arm N', and which terminates in an angular tip adapted to engage the opposite faces of a V-shaped offset on the pawl, as shown in dotted lines in Fig. 3.

An automatic return of the hand-lever N to its normal position after it has been depressed is produced by means of a spring, 107, adapted to be brought into action by the first movement of the lever.

In the use of the machine the hand-lever N is normally in an upright position, as shown in Figs. 1 and 3, the lid H of the cash-box is closed and locked, and the keys last played are locked. The cash-box cannot now be opened until a complete stroke down and back has been made of the handle. This movement may be utilized to operate an adding mechanism of approved construction by which the amount indicated by the keys last played is added to the sum of the amount previously indicated; but the devices for producing this result form no part of the present invention, and need not therefore be herein described or illustrated. The downstroke of the hand-lever N will operate to release the keys, turn the indicating-wheels to the zero sign, wind up the spring by which the drawer is operated, and also set the spring by whose resiliency an upstroke of the lever is produced so soon as the power or pressure thereon is removed. Once the downstroke of the lever has commenced it must be fully completed before the lever can be returned to its normal position, by reason of the engagement of the pawl 104 with the rack 102; but so soon as the end of its stroke is reached the pawl 104 is tripped or reversed by contact with the fixed stop 105, so that it is relieved from the rack 102 and thrown into contact with the opposite rack, 103. At the completion of the return or up stroke of the hand-lever (which is preferably enforced automatically by the spring 107) the lid H of the cash-box is thrown open by the release of the spring which actuates it, and the lever itself becomes locked in its upright position, so that it cannot again be moved until a key is played.

By playing a key the appropriate indicating-wheels are turned to bring to view on both sides of the machine a number corresponding with that of the key played, a type bearing the same number is brought into line of print, the hand-lever is unlocked, and the lid of the cash-box automatically closed and locked.

It is evident that instead of coupling the outer end of the connecting-rod 71 to a movable lid adapted to be carried back and forth over a fixed cash-receptacle it may be coupled to a movable cash-receptacle adapted to be carried back and forth under a fixed lid, and that, without departing from my invention, the actuating-wheel, driven and controlled in manner as described, may be made either to move a cover over a cash-box or to move a cash-box under a cover by coupling the reciprocating connecting-rod carried by the wheel either to the one or to the other. It is also evident that without departing from my invention the lid or cover of the cash-box may be made to slide in a horizontal plane back and forth over the box, instead of swinging back and forth over it, in manner as described.

I do not herein claim the combination, with a group of keys, of a locking-strip adapted to engage each key so soon as it is played and to be released by the movement of the oscillating hand-lever, said invention being the subject-matter of a claim made by C. E. Hadley and myself, as joint inventors, in a separate application for Letters Patent, Serial No. 268,432, now pending. Nor do I claim, broadly, duplicate indicating-wheels geared to move in unison and display simultaneously the same numbers at front and rear of the machine, my invention consisting in the novel combination and arrangement of a duplicate series at front and rear of the machine, each comprising two or more wheels geared and arranged to be simultaneously operated, so that the several numbers in both series shall simultaneously read correctly in the same order from left to right.

I claim as my invention—

1. The combination, in a cash-indicating machine, of a group of keys all having the same length of stroke, a single reciprocating rod moved differentially by the engagement therewith of each separate key at a different interval in the length of its stroke, and a series of signal characters or numbers designating severally the several keys, all actuated by the movements of the one rod and each brought to view by a different length of movement of said rod, substantially in the manner and for the purpose herein set forth.

2. The combination, in a cash-indicating machine, of a group of oscillating keys pivoted intermediate their ends upon a common shaft, a vertically-reciprocating rod mounted at the rear of said keys to be actuated thereby, a plate fixed to the vertical rod, with its lower edge extending transversely over the ends of said keys and having differential notches or offsets formed in said edge, each adapted to be engaged by one of said keys, (whereby each key in making its stroke will produce a different extent of movement of the rod,) and one or more wheels geared to said rod, to be revolved thereby, and which bear characters or numbers designating the several keys in the group, substantially in the manner and for the purpose herein set forth.

3. The combination, in a cash-indicating machine, of two or more groups of keys, a series of two or more indicating-wheels, each bearing numbers or characters corresponding with the keys in one of said groups, and which are mounted to be read in their normal order from left to right at the front of the machine, and a second series of duplicate wheels mounted to be read in similar order from left to right at the rear of the machine, the corresponding wheels in the two series being geared to move in unison and be actuated simultaneously by the movement of the one key appropriate thereto, substantially in the manner and for the purpose herein set forth.

4. The combination, in a cash-indicating machine, of a series of indicating-wheels, each revolving about a common axis, a corresponding series of concentric tubular shafts revolving upon the same axis, a type-wheel upon each shaft, a series of rock-shafts mounted parallel with the axis of the indicating-wheels, and suitable gear coupling each rock-shaft with an indicating-wheel at one end and with one of said tubular shafts at the other, substantially in the manner and for the purpose herein set forth.

5. The combination, in a cash-indicating machine, of one or more type-wheels, keys C, to operate said wheels, two superimposed, slotted, or perforated guide-plates mounted adjacent thereto and below the same, a platen moving through the opening in the plates into contact with the type-wheels, a spring operating to carry the platen toward the type, a stop to limit the action of the spring before the movement of the platen is completed, a pivotal lever adapted to withdraw the platen and contract the spring, and a yielding contact-point adapted to engage the lever as it moves in the direction to withdraw the platen and allow its independent return, substantially in the manner and for the purpose herein set forth.

6. The combination, in a cash-machine, of a movable lid, a pivoted segmental frame, to which said lid is secured, an actuating-wheel revolving upon an axis parallel with the pivotal axis of the lid, a wrist-pin upon the wheel, and a connecting-rod coupling the wrist-pin with the pivoted frame, whereby the revolution of the wheel is made to alternately open and close the lid, substantially in the manner and for the purpose herein set forth.

7. The combination, in a cash-machine, of a movable lid, an actuating-wheel revolving on an axis at a right angle to the line of movement of said lid, a wrist-pin upon the wheel, a connecting-rod coupling the wrist-pin and lid, a coiled spring actuating the wheel to produce an automatic revolution thereof, a controlling-disk secured to the axle of the wheel, to revolve with it, a movable stop-pin adapted to engage a notch or offset on said controlling-disk to arrest the movement of the wheel at each complete revolution thereof, a group of pivoted actuating-keys, a transverse bar pivoted above the ends of the keys, to be struck and lifted by either of them when the key is played, a rock-shaft mounted parallel with the axis of the actuating-wheel beneath the key-bar, a connecting-rod coupling said bar with a radial arm on the rock-shaft, and a radial arm projecting from the rock-shaft, to carry the stop-pin, whereby the play of a key will operate to disengage the stop-pin and allow the wheel to make its revolution, and thereby automatically open and close the lid, substantially in the manner and for the purpose herein set forth.

8. The combination, in a cash-machine, of a movable lid, an actuating-wheel revolving on an axis at a right angle to the line of movement of said lid, a wrist-pin upon the wheel, a coupling-rod connecting the wrist-pin and lid, a spring actuating the wheel to produce an automatic revolution thereof, a controlling-disk secured to the axle of the wheel, to revolve with it, a movable stop-pin adapted to engage a notch or offset on said controlling-disk, to arrest the movement of the wheel at each complete revolution thereof, a second movable stop-pin adapted to engage a second notch or offset formed at a diametrically-opposite point on the disk, to arrest the movement of the wheel at each half-revolution thereof after it is disengaged from the first stop-pin, a pivotal arm carrying said second stop-pin, a spring enforcing the engagement of the pin with the notch or offset, and an oscillating hand-lever adapted to move the arm and disengage the pin, substantially in the manner and for the purpose herein set forth.

9. The combination, substantially as set forth, of the actuating-wheel coupled, as herein described, to the reciprocating lid of a cash-machine, a controlling-disk secured to the axle of said wheel, to revolve with it, a movable stop-pin adapted to engage a stop or offset on said disk, to arrest its movement at a complete revolution thereof, a second movable stop-pin adapted to engage a second notch or offset on said disk, to arrest its movement at a half-revolution thereof after it has been disengaged from the first stop-pin, a pivoted arm carrying said second stop-pin, a spring enforcing the engagement of the pin with the notch or offset, a second winding-disk mounted parallel with the controlling-disk, to revolve independently about the same axis, a helical spring coiled between the two disks and secured at either end thereto, a pawl pivoted outside the winding-disk, to engage a notch in its periphery and prevent a reverse movement of the disk after the spring is wound, a toothed wheel revolving loosely upon the hub or axle of the winding-disk, a pawl pivoted to said disk, to engage the toothed wheel and prevent its independent rotation as the spring is wound, an oscillating hand-lever, a segmental rack carried by said lever and which gears with said toothed wheel, a spring-actuated yielding stop fitted upon the arm which carries the second stop-pin, to engage the controlling-disk, and a tooth upon the segmental rack adapted to slip by the yielding stop as the rack moves forward, to wind up the spring and to engage the stop and move the lever so as to release the controlling-disk at the end of the return-stroke of the rack, substantially in the manner and for the purpose herein set forth.

In testimony whereof I have signed my name to this specification in the presence of two subscribing witnesses.

WILLIAM KOCH.

Witnesses:
 A. N. JESBERA,
 E. M. WATSON.